United States Patent
Daugherty et al.

(10) Patent No.: US 6,612,955 B2
(45) Date of Patent: Sep. 2, 2003

(54) POWER TRANSMISSION BELT

(75) Inventors: Jerry Daugherty, Littleton, CO (US); Craig Kopang, Bennett, CO (US)

(73) Assignee: The Gates Corporation, Denver, CO (US)

(*) Notice: Subject to any disclaimer, the term of this patent is extended or adjusted under 35 U.S.C. 154(b) by 48 days.

(21) Appl. No.: 09/733,165

(22) Filed: Dec. 8, 2000

(65) Prior Publication Data

US 2002/0072445 A1 Jun. 13, 2002

(51) Int. Cl.[7] .............................. F16G 3/10; F16G 1/00
(52) U.S. Cl. ................ 474/258; 474/254; 474/260; 156/137; 156/139
(58) Field of Search .................. 474/263, 264, 474/260, 253, 254, 258, 266; 156/324, 137, 139, 304.1, 304.3, 304.6; 428/58, 61, 114, 125; 451/531; 442/149, 327; 3/338, 312

(56) References Cited

U.S. PATENT DOCUMENTS

| | | | | |
|---|---|---|---|---|
| 1,728,673 A | * | 9/1929 | Driver | 451/531 |
| 2,039,258 A | | 4/1936 | Patterson | 154/43 |
| 2,391,731 A | * | 12/1945 | Miller et al. | 156/137 |
| 3,546,054 A | * | 12/1970 | Ross | 474/258 |
| 4,215,516 A | * | 8/1980 | Huschle et al. | 156/304.3 |
| 4,289,820 A | * | 9/1981 | Blessing | 428/125 |
| 4,563,379 A | * | 1/1986 | Kruger | 156/304.6 |
| 5,224,905 A | | 7/1993 | Mishima | 474/258 |
| 5,344,369 A | * | 9/1994 | Kitahama et al. | 474/253 |
| 5,773,114 A | * | 6/1998 | Adams | 428/58 |
| 5,778,456 A | * | 7/1998 | Schimmel | 2/338 |
| 5,942,301 A | * | 8/1999 | Schlueter, Jr. et al. | 474/254 |
| 5,961,760 A | * | 10/1999 | Tajima et al. | 156/139 |

FOREIGN PATENT DOCUMENTS

| | | | |
|---|---|---|---|
| EP | 0 481 652 B1 | | 9/1995 |
| EP | 0 742 383 B1 | | 9/2000 |
| JP | 03-93502 | * | 4/1991 |
| JP | 2001-301937 | * | 10/2001 |

* cited by examiner

Primary Examiner—Marcus Charles
(74) Attorney, Agent, or Firm—J. A. Thurnau, Esq.; C.H. Castleman, Esq.; S. G. Austin, Esq.

(57) ABSTRACT

A power transmission belt having a compression section, a load carrying section and an outer cover layer. The outer cover layer comprises a fabric; fiber loaded stock or blended material for reinforcement. The cover layer is spliced together using a thin non-woven strip of material spanning across the butted ends of the cover layer. The thin strip used in the splice significantly reduces belt noise by being subsumed into the adhesion rubber layer during fabrication.

21 Claims, 1 Drawing Sheet

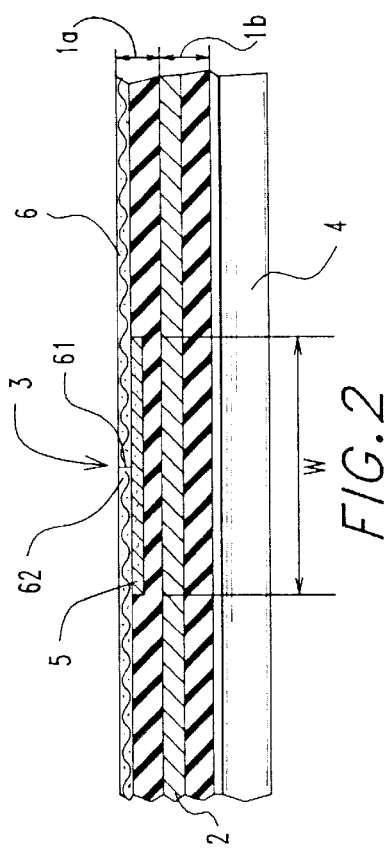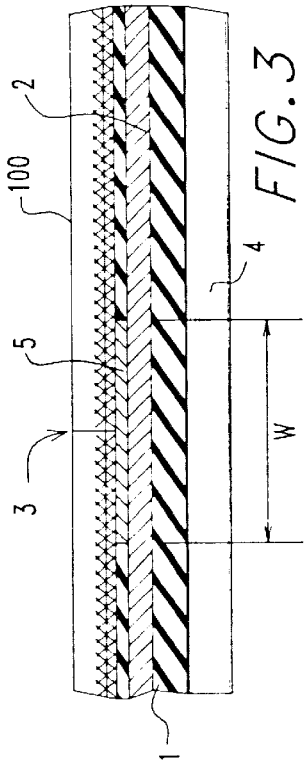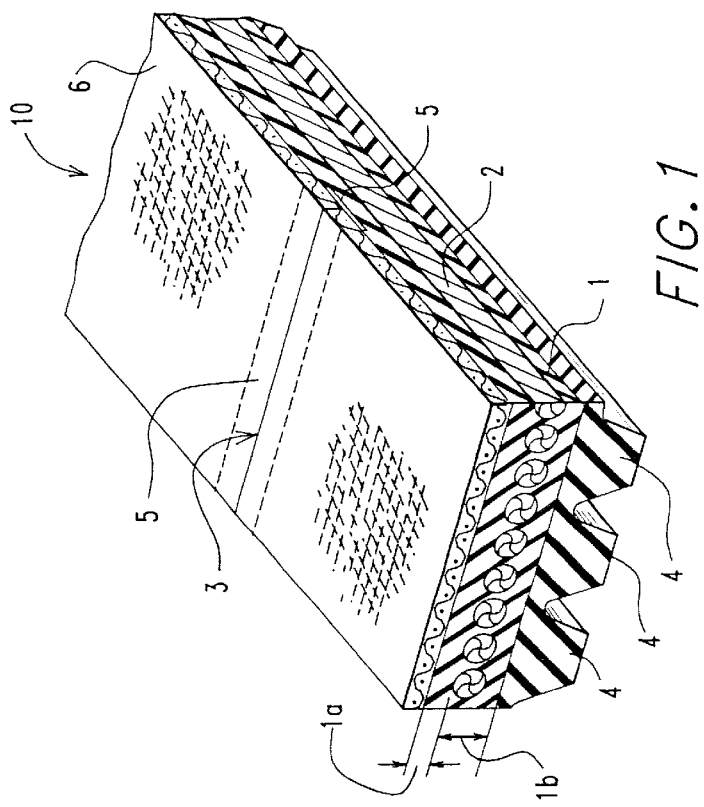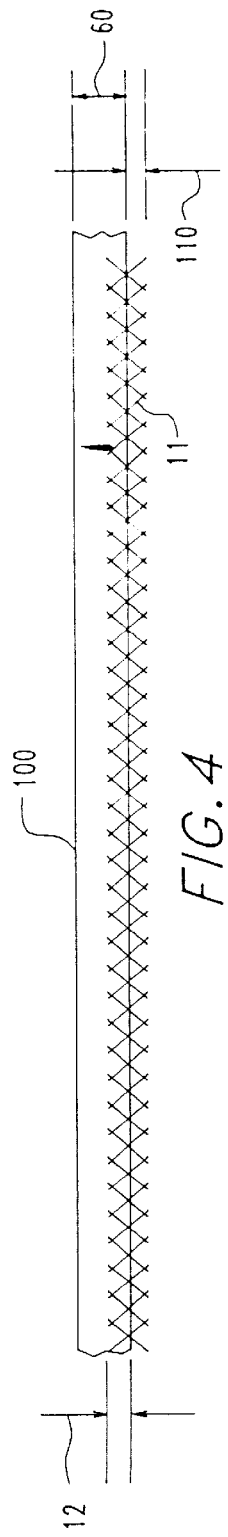

POWER TRANSMISSION BELT

FIELD OF THE INVENTION

The invention relates to power transmission belts and more particularly to power transmission belts having a layer spliced with a non-woven backing material.

BACKGROUND OF THE INVENTION

It is well known in the art to adhesively bond a cover layer to an outer surface of a power transmission belt in order to reinforce the belt. The layer may comprise fabric. The cover layer is laid under successive layers as the belt is fabricated on a mandrel. The ends of the layer are joined together to define the endless layer on the belt build.

The cover layers may also comprise other materials such as rubber coated fabrics or fiber loaded sheet materials. These are often bias cut and re-oriented to optimize flex and support characteristics in the finished product. The sheets are re-attached after the change in orientation by either overlapping and adhering their edges or by butting and sewing the edges together or butting and thermally splicing the edges together. The overlapped material can cause thickness irregularities in the product that result in rough running or noisy belt operation. The sewn edges avoid most of the thickness problems, but are generally more costly to make.

Another method can involve application of a fusible strip spanning between the ends of the cover layer. This method requires a fusible strip to be applied and heated at a vulcanizing or melting temperature. This again can cause thickness irregularities in the belt.

Representative of the art is EP patent 0 742 383 B1 which discloses a belt having a laminate comprising a fabric sheet and an adhesion rubber sheet. The ends of the laminate are butt spliced together by seaming or thermal setting.

Another representative of the art is U.S. Pat. No. 5,224,905 (1993) to Mishima which discloses a belt having a uniform cross-sectional configuration along its entire length and having a fabric layer that is butt-spliced together. The butt-splice is accomplished by sewing or by using an overlapping material comprising a thermo-plastic resin.

What is needed is a belt having a spliced cover layer using a non-woven strip. What is needed is a belt having a butt-spliced cover layer using a non-woven strip on a surface of the adjoining ends. What is needed is a belt having a butt-spliced layer using a non-woven strip having a thickness substantially less than the thickness of the attached ply. What is needed is a belt having a spliced single cover layer using a non-woven strip whereby belt noise and vibration is reduced. The present invention meets these needs.

SUMMARY OF THE INVENTION

The primary aspect of the invention is to provide a belt having a spliced layer using a strip comprising non-woven material.

Another aspect of the invention is to provide a belt having a butt-spliced layer using a strip comprising non-woven material on a surface of the adjoining ends.

Another aspect of the invention is to provide a belt having a butt-spliced layer using a non-woven strip having a thickness substantially less than the thickness of the attached ply.

Another aspect of the invention is to provide a belt having a spliced single cover layer using a non-woven strip whereby belt noise and vibration is reduced.

Other aspects of the invention will be pointed out or made obvious by the following description of the invention and the accompanying drawings.

The invention comprises a power transmission belt having a compression section, a load carrying section and an outer layer. The outer cover layer comprises a fabric layer or fiber loaded stock for reinforcement. The cover layer is butt-spliced together using a non-woven strip of material spanning across the butted ends of the cover layer. The thin strip used in the splice significantly reduces belt noise.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 1 is a perspective view of the belt.

FIG. 2 is an elevation view of the splice portion of the belt.

FIG. 3 shows an alternate embodiment of the splice portion of the inventive belt.

FIG. 4 shows a detail of a combination layer.

DETAILED DESCRIPTION OF THE PREFERRED EMBODIMENT

FIG. 1 is a perspective view of the belt. The inventive belt described here uses a thin, narrow strip of non-woven fabric applied across the abutted edges of two pieces of a cover layer to hold the cover layer edges together. The cover layer may comprise a rubber sheet stock, a fiber loaded rubber sheet stock, fabric, rubber coated fabric, combination layer, or other material known in the art. The non-woven strip can be adhered to the cover layer with either a process compatible adhesive, or a pressure roller, each known in the art. The non-woven acts like an adhesive tape that attaches the abutted layer together. The chosen strip thickness and width does not cause any significant thickness variations or discontinuities in the surface of the belt, thereby avoiding rough running or noise problems in the product. Process costs are reduced for the inventive belt as compared to sewing a butt-splice because of both material and cycle time reductions.

The strip of non-woven material can be made from any appropriate non-woven fiber known in the art that has the tenacity to adjoin the stock sheet layer well enough to maintain adhesion through the production process. The strip is also narrow and flexible enough to prevent the creation of a rigid section in the cured product. Further, the non-woven strip can be used to hold successive sheets together as in a wound roll during the banner operation; or it can be used to form a cylindrical sleeve that is installed over the build drum.

Therefore, the inventive belt 10 comprises a load section comprising tensile members or cords 2 embedded within or adjacent to an adhesion rubber layer 1. In the preferred embodiment, adhesion layer 1 forms an upper portion 1a and a lower portion 1b. Cords 2 may be embedded within the adhesion rubber layer as shown, or be placed upon a surface of the adhesion rubber layer between the adhesion rubber layer and the compression section 4.

Ribs 4 may comprise any profile known in the art. A multi-ribbed embodiment is shown. Cover layer 6, which may comprise a rubber sheet stock, a fiber loaded rubber sheet stock, fabric, cellulose material, rubber coated fabric, combination layer, or other material known in the art, overlays the upper portion 1a of the adhesion rubber layer 1 across a width of belt 10.

Ends 61, 62 of layer 6 are butted together to form a splice, more particularly, to form a portion of splice 3. Underlying the splice 3 between the layer 6 and the adhesion layer 1a is a non-woven strip 5. Strip 5 comprises a non-woven material having a thickness in the range of 1.0 to 6.0 mils according to ASTM D-1777-64. In the preferred embodiment, the thickness is 3.3 mils, which is substantially less than the thickness of the attached ply. A belt ply can have a thickness in the range of 0.008" to 0.200". The weight of the material is in the range of 0.3 to 1.5 ounces per square yard according to ASTM D-3776-85. In the preferred embodiment the weight is 0.5 ounces per square yard. The width W of the strip across the splice is in the range of 3/16" to 1". This range of widths provides the mechanical strength required to connect the layer ends together without substantially affecting the modulus of the completed belt in the region of the splice. In the preferred embodiment the width of the strip is ½". The tensile strength of the strip in the machine direction is in the range of 7 to 59 pounds per 4" wide piece of material according to ASTM D-1682-64. The preferred embodiment has a tensile strength of 16 pounds in the machine direction.

The non-woven material may comprise any cellulose based or synthetic based material. A synthetic based non-woven material, nylon, is used in the preferred embodiment.

During fabrication, layer 6 is first laid on the mandrel. The ends 61, 62 of the layer are butted together. A strip 5 of non-woven material is placed so as to span across the ends 61, 62 of the layer 6. The strip also spans the entire width of the cover layer from side to side of the belt. The ends may span across the width of the belt normally to the sides as shown in FIG. 1 or, in the case of banner splices, may span the belt diagonally.

The non-woven strip is then pressed into contact with the layer ends. The tack of the layer is often sufficient to hold the non-woven strip 5 in place during the remaining steps of fabrication process, including vulcanization. Adhesive bonding or ultrasonic techniques can also be used to adhere the strip as needed.

The strip 5 remains between the layer 6 and the adhesion rubber layer 1 throughout the fabrication process. Although this results in a discontinuity in the longitudinal cross-section of the belt, due to the thinness of the strip 5 as compared to the ply and the rest of the belt, the effect of the strip 5 on the belt during operation is not detectable. The outer surface of the layer is uniform across the splice as the strip itself is partially subsumed into the adhesion rubber layer 1a during vulcanization. Therefore, the noise caused by a discontinuity caused by a prior art splice running over a pulley or backside idler is significantly reduced or eliminated in the inventive belt.

FIG. 2 is a cross-sectional elevation view of the splice portion of the belt. Ends 61, 62 are butted together. Strip 5 is the laid over the splice area during lay-up on a forming mandrel. Pressure is then applied to the joint to adhere the strip to the adhesion layer 1a. Strip 5 fixes the layer ends 61, 62 in place during the remaining fabrication steps. Adhesion layer 1, including tensile cords 2, is then laid over the layer 6 and the strip 5. Compression section 4 is then laid over layer 1. Once the build is complete, the mandrel is placed in a vulcanizer for vulcanization in a manner known in the art. During vulcanization, the elastomeric in layer 1 partially flows around the strip 5 but does not otherwise cause the splice area to cause a discontinuity in the surface of the finished belt. This reduces or eliminates the operational noise of the belt as the backside trains across pulleys or idlers.

FIG. 3 shows an alternate embodiment of the splice portion of the inventive belt. In this embodiment, an elastomeric material 11 is calendered onto a surface of a fabric layer 60, the combination forming combination layer 100. During the calendering operation, the elastomeric material is pressed partially into a thickness 12 of the cover layer fabric 60, which also leaves a layer of elastomeric 110 on the surface of the fabric, see FIG. 4, a detail of the combination layer. During fabrication, the combination layer 100 is laid up first on a mandrel. Combination layer 100 is spliced together using strip S as described in this disclosure. The tensile members or cords 2 and elastomeric layer 1 are then overlaid on the layer 100 in such successive layers as may be required by a user as otherwise described herein.

I claim:

1. An endless belt comprises:
   an adhesion rubber layer;
   a load carrying section embedded within the adhesion rubber layer;
   a cover layer adhered to a surface of the adhesion rubber layer
   the cover layer having ends, the ends having a width across a belt and the ends being butted together at a splice; and
   a non-woven strip spanning across the ends of the cover layer.

2. The belt as in claim 1, wherein the strip has a thickness in the range of 1.0 to 6.0 mils.

3. The belt as in claim 2, wherein the strip further comprises a width in the range of 3/16" to 1".

4. The belt as in claim 3, wherein the strip further comprises a weight in the range of 0.3 to 1.5 ounces per square yard.

5. The belt as in claim 1, wherein the strip thickness is substantially less than the thickness of the cover layer.

6. The belt as in claim 5, wherein the cover layer comprises fabric loaded stock.

7. The belt as in claim 5, wherein the strip comprises fabric.

8. The belt as in claim 7, wherein the strip comprises a cellulose material.

9. The belt as in claim 7, wherein the cover layer comprises a synthetic material.

10. The belt as in claim 5, wherein the cover layer comprises a blended stock.

11. The belt as in claim 10, wherein the blended stock comprises an elastomeric material partially pressed into a thickness of a fabric material.

12. An endless belt comprising:
    an adhesion rubber layer;
    a compression section adhered to the adhesion rubber layer;
    a load carrying section embedded within the adhesion rubber layer;
    a cover layer adhered to a surface of the adhesion rubber layer;
    the cover layer having ends butted together;
    a non-woven strip spanning the ends;
    the non-woven strip is subsumed in the adhesion rubber layer.

13. The belt as in claim 12, wherein the strip further comprises a weight in the range of approximately 0:3 to 1.5 ounces per square yard.

14. The belt as in claim 12, wherein the strip comprises a cellulose material.

15. The belt as in claim 12, wherein the strip comprises a synthetic material.

16. The belt as in claim 12, wherein the cover layer comprises fabric loaded stock.

17. The belt as in claim 12, wherein the cover layer comprises a blended stock.

18. The belt as in claim 17, wherein the blended stock comprises an elastomeric material partially pressed into a thickness of a fabric material.

19. The belt as in claim 12, wherein the strip is disposed between the cover layer and the adhesion rubber layer.

20. The belt as in claim 19, wherein the strip is adhered between the cover layer and the adhesion rubber layer.

21. A method of fabricating a belt comprising:
laying a cover layer about a mandrel;
butting ends of the cover layer together;
pressing a non-woven strip across the ends;
laying an adhesive rubber layer about the cover layer;
applying a pressure to the adhesive rubber layer to adhere the non-woven strip;
applying tensile members to the adhesive rubber layer;
laying a compression layer about the adhesive rubber layer;
vulcanizing the belt; and
subsuming the non-woven strip in the adhesion rubber layer during vulcanization whereby the cover layer has a uniform outer surface across the non-woven strip.

* * * * *